(12) United States Patent
Chen et al.

(10) Patent No.: US 8,811,483 B2
(45) Date of Patent: *Aug. 19, 2014

(54) VIDEO PROCESSING APPARATUS AND METHOD

(71) Applicants: Wei-Jen Chen, Danshuei Township, Taipei County (TW); Chung-Bin Wu, Kaohsiung (TW)

(72) Inventors: Wei-Jen Chen, Danshuei Township, Taipei County (TW); Chung-Bin Wu, Kaohsiung (TW)

(73) Assignee: MediaTek Inc., Hsin-Chu (TW)

( * ) Notice: Subject to any disclaimer, the term of this patent is extended or adjusted under 35 U.S.C. 154(b) by 24 days.

This patent is subject to a terminal disclaimer.

(21) Appl. No.: 13/770,148

(22) Filed: Feb. 19, 2013

(65) Prior Publication Data

US 2013/0156104 A1 Jun. 20, 2013

Related U.S. Application Data (63) Continuation of application No. 12/563,387, filed on Sep. 21, 2009, now Pat. No. 8,401,077.

(51) Int. Cl.
*H04N 21/4425* (2011.01)
*H04N 7/26* (2006.01)

(52) U.S. Cl.
CPC ... *H04N 19/00933* (2013.01); *H04N 19/00218* (2013.01); *H04N 19/00103* (2013.01); *H04N 19/00266* (2013.01); *H04N 19/00533* (2013.01); *H04N 21/4425* (2013.01)
USPC .................................................. 375/240.15

(58) Field of Classification Search
USPC ..................................................... 375/240.18
See application file for complete search history.

(56) References Cited

U.S. PATENT DOCUMENTS

| | | | |
|---|---|---|---|
| 5,543,847 A | 8/1996 | Kato | |
| 6,898,246 B2 | 5/2005 | Katayama | |
| 2002/0048321 A1 | 4/2002 | Katayama | |
| 2007/0058730 A1 | 3/2007 | Bowra et al. | |

FOREIGN PATENT DOCUMENTS

| | | |
|---|---|---|
| CN | 1334654 | 2/2002 |
| CN | 1334654 | 9/2008 |

OTHER PUBLICATIONS

English language translation of abstract of CN 1334654 (published Sep. 3, 2008).

*Primary Examiner* — Mark Rinehart
*Assistant Examiner* — Maharishi Khirodhar
(74) *Attorney, Agent, or Firm* — McClure, Qualey & Rodack, LLP (57) ABSTRACT

A video processing method includes decoding a bitstream that includes a plurality of groups of pictures and each group of pictures comprises a frame sequence, determining whether a current frame of a current group of pictures to be displayed has macroblocks with forward reference to a previous frame of a previous group of pictures, wherein the current group of pictures is subsequent to the previous group of pictures, and displaying the current frame of the current group of pictures when the current frame has no macroblock with forward reference to the previous frame of the previous group of pictures. The previous frame of the previous group of pictures is determined to be referenced by the current frame of the current group of pictures according to information specified from the encoding of the current frame.

7 Claims, 7 Drawing Sheets

VIDEO PROCESSING APPARATUS AND METHOD

CROSS REFERENCE TO RELATED APPLICATIONS

This application is a Continuation of pending U.S. patent application Ser. No. 12/563,387 filed Sep. 21, 2009, and entitled "Video Processing Apparatus and Method," the entirety of which is incorporated herein by reference.

BACKGROUND

1. Field

The disclosed embodiments relate to video processing, and more particularly relate to a video processing apparatus capable of displaying a video bitstream with absent reference frames and a video processing method for the same.

2. Description of the Related Art

Various functionalities are implemented in a video system in order to conveniently store, process or transmit video data. For example, some video coding standards, such as MPEG 1/2/4 and H.26x, are provided to perform video data compression and decompression, so as to improve storage capacity and transmission bandwidth. These video coding standards employ block-based compression on the video data having a series of video frames by encoding later video frames based on earlier video frames. Specifically, the video data compression is achieved by reducing temporal redundancies between video frames and spatial redundancies within one single video frame. Also, some compression techniques, e.g., discrete cosine transform and motion compensation, are performed to generate a standard compliant bitstream with a relatively high compression ratio. As a result, the bitstream is allowed to be transmitted and stored in an efficient and standardized manner.

However, due to the characteristics of the video coding standards, when undesired or unrecoverable errors are introduced to the bitstream during compression or transmission, the later video frames may be erroneously decoded because of the absent or unavailable earlier video frames. Typically, the later video frames encoded with reference to the absent or unavailable earlier video frames are skipped and not displayed. This undesirable skip of frame display may cause abrupt scene changes or discontinuous scene movements, thus resulting in unfavorable viewing experiences for users.

Therefore, a video processing method for a video processing apparatus capable of processing and smoothly displaying video frames with absent or unavailable reference frames is desirable.

BRIEF SUMMARY

Video processing methods and video processing apparatuses are provided.

An embodiment of a video processing method includes the following steps. First, a bitstream is decoded. The bitstream includes a plurality of groups of pictures (GOPs) and each group of pictures includes a frame sequence. It is then determined whether a current frame of a current group of pictures to be displayed has macroblocks with forward reference to a previous frame of a previous group of pictures. The current group of pictures is subsequent to the previous group of pictures. When the current frame has no macroblock with forward reference to the previous frame of the previous group of pictures, the current frame of the current group of pictures is displayed.

Further, another embodiment of a video processing method includes the steps of: decoding a bitstream, wherein the bitstream includes a plurality of groups of pictures and each group of pictures includes a frame sequence; determining whether a current frame of a current group of pictures to be displayed has macroblocks with forward reference to a previous frame of the current group of pictures, wherein the current frame is subsequent to the previous frame; establishing a desired frame when the current frame has macroblocks with forward reference to the previous frame of the current group of pictures and the previous frame is absent, wherein the desired frame is established by acquiring macroblock information of the desired frame according to remaining macroblocks of a plurality of frames of the current group of pictures including the current frame other than those with forward reference to the previous frame and the frames of the current group of pictures other than the current frame follow the current frame.

Further, another embodiment of a video processing apparatus includes a decoder, a controller and a display device. The decoder is provided for decoding a bitstream. The bitstream includes a plurality of groups of pictures and each group of pictures includes a frame sequence. The controller is coupled to the decoder for determining whether a current frame of a current group of pictures to be displayed has macroblocks with forward reference to a previous frame of a previous group of pictures. The current group of pictures is subsequent to the previous group of pictures. The display device is coupled to the controller for displaying the current frame of the current group of pictures when the current frame has no macroblock with forward reference to the previous frame of the previous group of pictures.

Further, another embodiment of a video processing apparatus includes a decoder and a controller. The decoder is provided for decoding a bitstream. The bitstream includes a plurality of groups of pictures and each group of pictures includes a frame sequence. The controller is coupled to the decoder for determining whether a current frame of a current group of pictures to be displayed has macroblocks with forward reference to a previous frame of the current group of pictures which is followed by the current frame, and establishing a desired frame when the current frame has macroblocks with forward reference to the previous frame of the current group of pictures and the previous frame is absent, wherein the desired frame is established by acquiring macroblock information of the desired frame according to remaining macroblocks of a plurality of frames of the current group of pictures including the current frame other than those with forward reference to the previous frame and the frames of the plurality of frames of the current group of picture other than the current frame follow the current frame.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
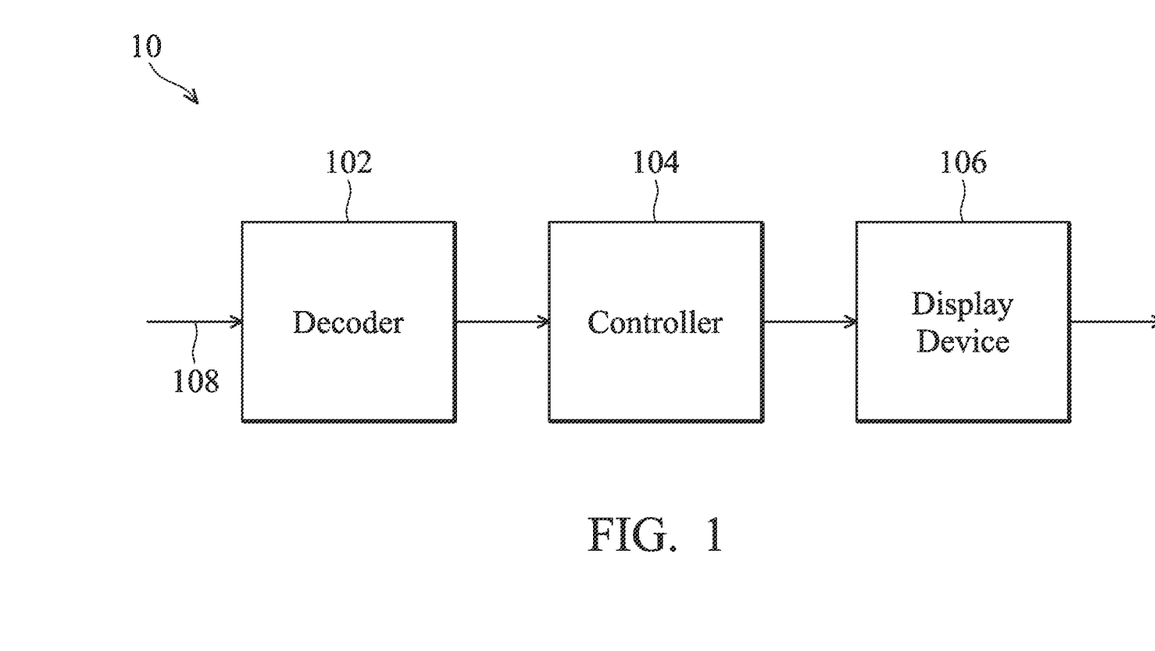
FIG. 1 is a block diagram illustrating an embodiment of a video processing apparatus.

FIG. 1 is a block diagram illustrating an embodiment of a video processing apparatus 10. As shown in FIG. 1, the video processing apparatus 10 comprises a decoder 102, a controller 104 and a display device 106. The decoder 102 receives and decodes a bitstream 108. According to an embodiment, the bitstream 108 is an MPEG-coded bitstream having a plurality of groups of pictures (GOPs), as shown in FIGS. 2A and 2B.

Figure 2A:
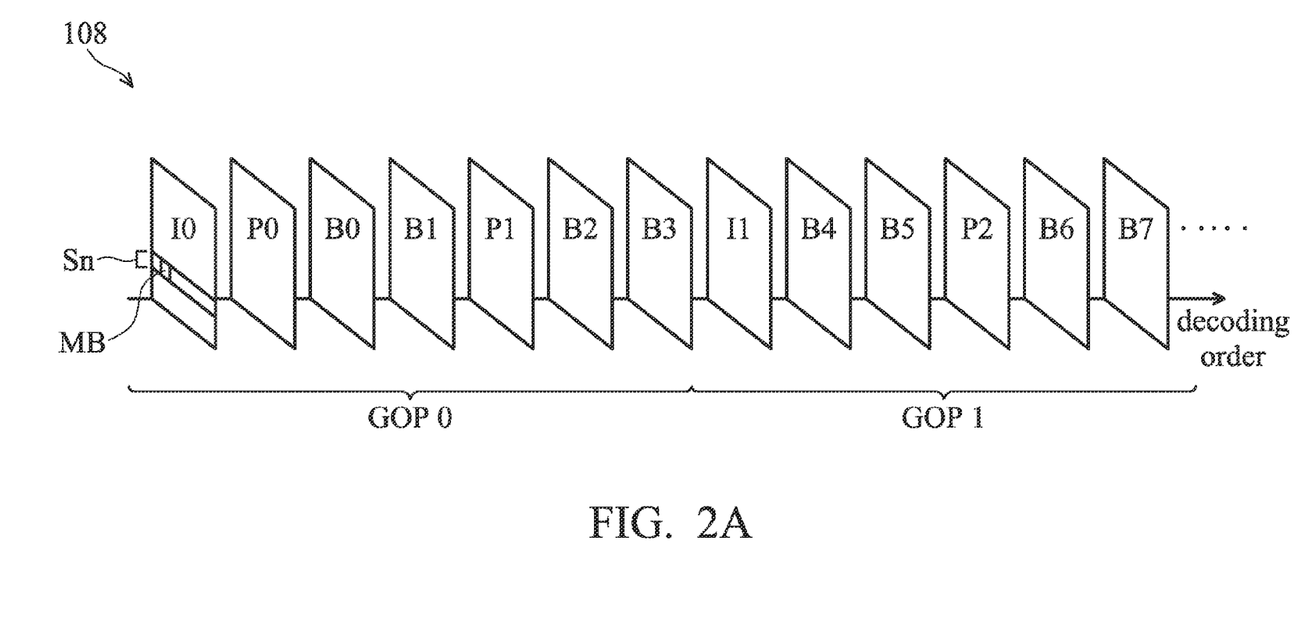
FIGS. 2A and 2B are diagrams illustrating the picture architecture of an exemplary MPEG-coded bitstream.
Figure 2B:
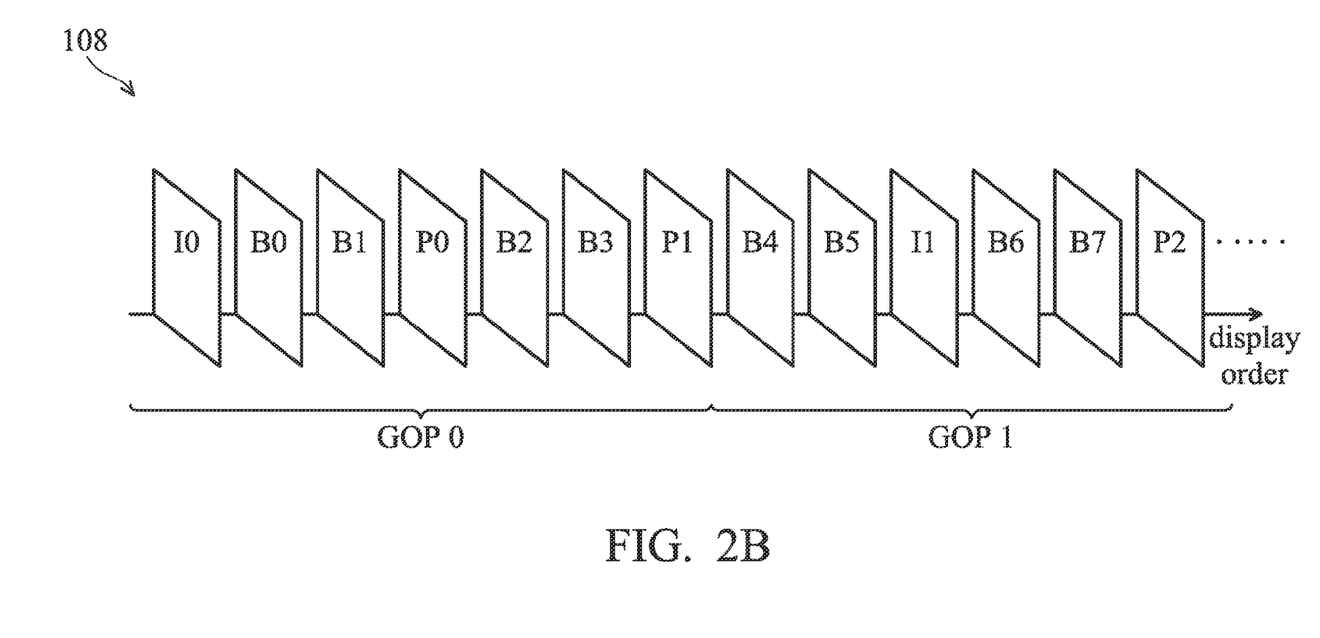

FIG. 2A is a diagrams illustrating groups of pictures in a decoding order and FIG. 2B is a diagrams illustrating groups of pictures in a display order.

Referring to FIGS. 2A and 2B, there are two groups of pictures GOP0 and GOP1. Each GOP comprises a frame sequence, such as GOP0, which begins with an intra-coded frame (I-frame) I0 followed by an arrangement of predictive-coded frames (P-frame) P0, P1 and bi-directional predictive-coded frames (B-frame) B0, B1, B2 and B3. The intra-coded frame I-frame is coded without reference to other frames. The predictive-coded frame P-frame is coded with temporal reference to the previous I-frame or P-frame. Generally, I-frames and P-frames are known as reference frames and used to define future frames in the decoding order. The bi-directional predictive-coded frame B-frame is coded with reference to the previous and following I-frames or P-frames within one GOP. Note that for a current GOP1 in the decoding order as shown in FIG. 2A, it is also possible for a first B-frame B4, which is following the first I-frame I1 of the current GOP, to refer to some frames within a previous GOP0. In this case, a flag Close_GOP is used in the header of the GOP1 to indicate that the B-frame is encoded with forward reference to some frames of the previous GOP0. Further, each frame, e.g., an I-frame I0, is divided into multiple slices, such as a slice Sn. Each slice comprises a plurality of macroblocks. A macroblock MB represents a group of pixels, e.g., 8×8, 8×16, 16×8 and 16×16 block. The 8×8 block may be sub-partitioned into block sizes of 4×4, 4×8 or 8×4.

As show in FIGS. 2A and 2B, the decoding order of the bitstream 108 and the display order thereof are different. In FIG. 2A, the decoding order of the GOP0 and GOP1 decoded by the decoder 102 in FIG. 1 is "I0, P0, B0, B1, P1, B2, B3, I1, B4, B5, P2, B6, B7", while in FIG. 2B, the display order of the GOP0 and GOP1 on the display device 106 in FIG. 1 is "I0, B0, B1, P0, B2, B3, P1, B4, B5, I1, B6, B7, P2". As described above, the decoding of the P-frames or B-frames may require decoded data derived from decoding one or earlier reference frames. When the earlier reference frames being referenced by the P-frames or B-frames are absent or invalid, the later P-frames or B-frames are unable to be decoded.

Figure 3:
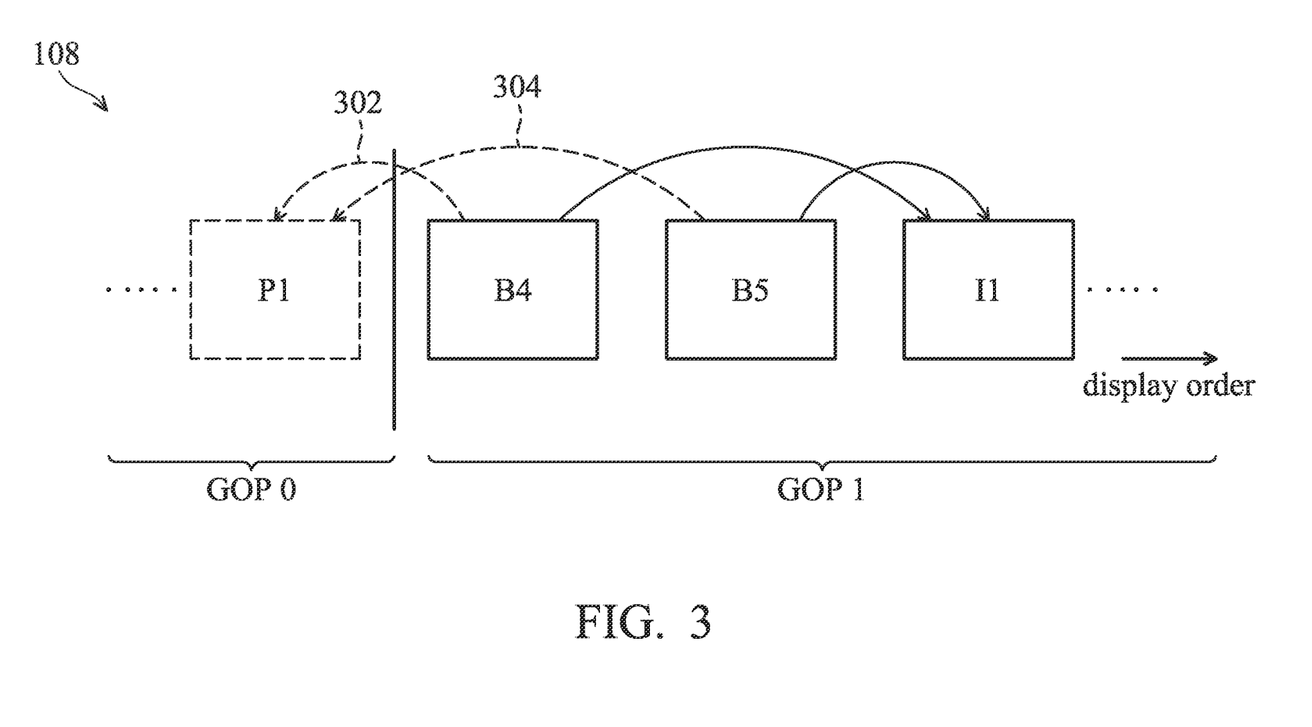
FIG. 3 is a diagram that illustrates an embodiment of processing a bitstream with absent reference frames.

FIG. 3 is a diagram that illustrates an embodiment of processing a bitstream 108 with absent reference frames. Referring to FIGS. 1 and 3, it is assumed that a P-frame P1 is absent due to the absent GOP0. In an embodiment, upon a channel change to a new channel, the GOP0 associated with the new channel may not be able to be received by the decoder 102, thereby making the P-frame P1 absent. In another embodiment, if the GOP0 is stored in a defective area of a storage medium, e.g., a disk, the GOP0 may no longer be available for the decoder 102 and the P-frame P1 becomes absent.

During operation, the controller 104 coupled to the decoder 102 then determines whether the two B-frames B4 and B5 of a following GOP1 have macroblocks with forward reference to the previous GOP0, as shown by arrows 302 and 304 of FIG. 3. In some embodiments, the two B-frames B4 and B5 may be important for some logo or key frames.

From the aforementioned description, since the two B-frames B4 and B5 to be displayed is following the I-frame I1 in the decoding order as shown in FIG. 2A, the flag Close_GOP may be directly used to determine whether the B-frames B4 and B5 have been only encoded with backward reference frames or were intra-coded. However, because the flag Close_GOP may be set during any editing period occurring after the encoding process, thus making the flag Close_GOP unreliable to use.

Thus, instead of using the flag Close_GOP, the controller 104 determines whether the P-frame P1 of the GOP0 is referenced by the two B-frames B4 and B5 according to information specified from the encoding of the two B-frames B4 and B5 to indicate the reference to be used. For example, the specified information may be the motion vector information for indicating the reference frame to be used.

When the controller 104 determines that the two B-frames B4 and B5 of the subsequent GOP1 have no macroblock with forward reference to the previous GOP0, such as the P-frame P1, the display device 106 coupled to the controller 104 then displays the two B-frames B4 and B5 as they can be correctly decoded.

Otherwise, the two B-frames B4 and B5 that refer to the absent forward reference frame P1 are skipped and not displayed by the controller 104, so that the display device 106 may avoid displaying the erroneously decoded B-frames B4 and B5.

Figure 4:
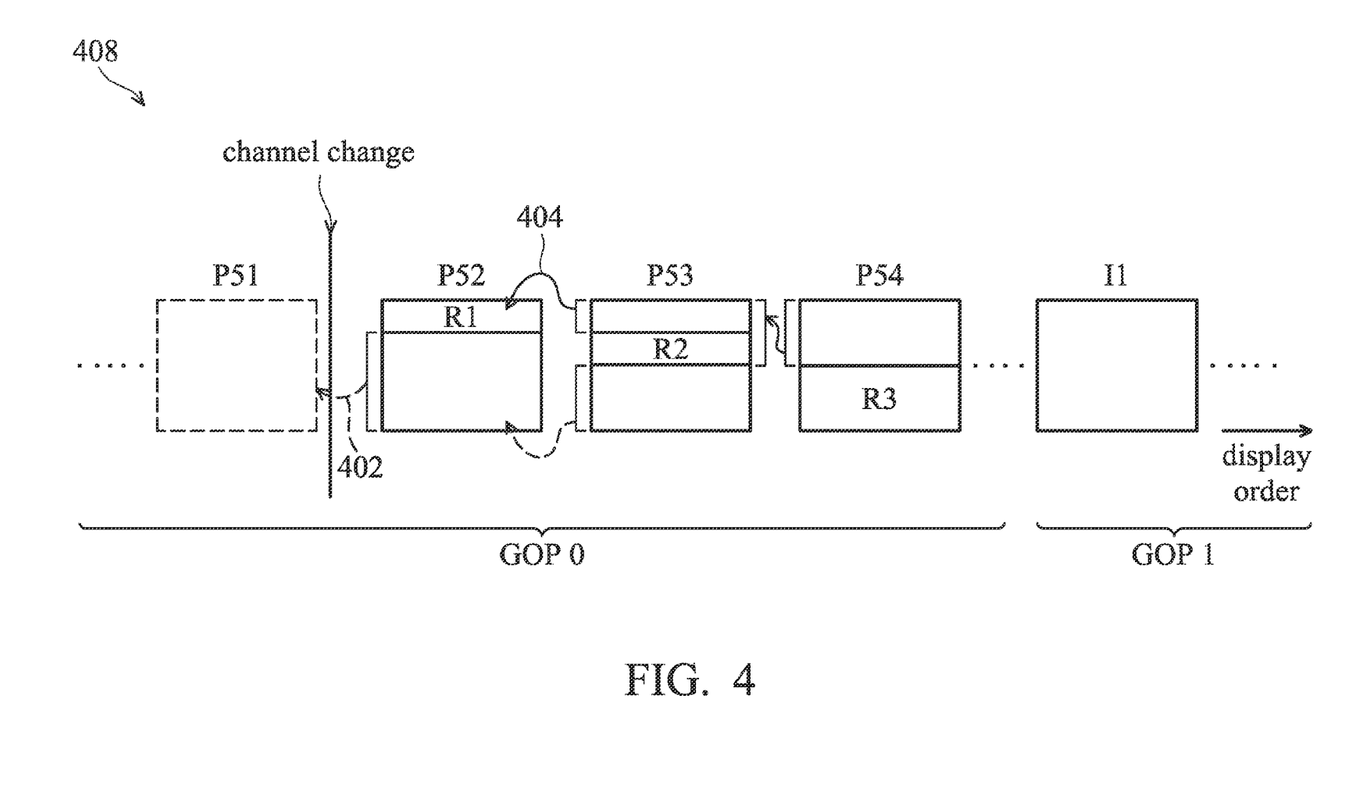
FIG. 4 is a diagram that illustrates another embodiment of processing a bitstream with absent reference frames.

FIG. 4 is a diagram that illustrates another embodiment of processing a bitstream 408 with absent reference frames.

Typically, when a user initiates changing a channel, the decoder 102 as shown in FIG. 1 cannot begin decoding the bitstream 408 until a next I-frame or a next GOP boundary is recognized. However, referring to FIG. 4, when the size of a current GOP0 with the absent I-frame I0 (not shown) is large, the waiting time period for the next I-frame (i.e., I1) or the next GOP boundary (i.e., GOP1) is accordingly longer, thereby significantly increasing the time for changing channels or latency. Further, when changing a channel, the channel to be viewed displays a black color or renders distorted frames, which were erroneously decoded by the decoder 102, until the next I-frame I1 is available, thereby, deteriorating users' video viewing experience.

Thus, according to an embodiment, before receiving the next I-frame I1, the controller 104 may employ some useful information of the current GOP0 for eliminating the above-mentioned drawbacks.

More specifically, as shown in FIG. 4, upon changing of a channel, the decoder 102 begins to receive the new bitstream 408 associated with the channel to be viewed. Note that it is assumed that the new bitstream 408 associated with the channel to be viewed, has just missed the frames prior to a P-frame 52 of the GOP0.

During operation, the controller 104 determines whether a current frame to be displayed, such as a P-frame P52 of the GOP0, has macroblocks with forward reference to an absent frame, such as a P-frame P51 of the GOP0.

When the controller 104 determines the P-frame P52 has no macroblock with forward reference to the absent P-frame P51, i.e., all macroblocks of the P-frame P52 are intra-coded, the display device 106 then displays the P-frame P52, so as to ensure that users will view a correctly decoded P-frame P52 without latency in changing channels.

Furthermore, when the absent P-frame P51 is determined to be referenced by a portion of macroblocks of the P-frame P52, as shown by an arrow 402, it is then determined that the remaining macroblocks R1 are intra-coded. The inter-coded macroblocks of the P-frame P52 may be erroneously decoded as they are forward referenced to the absent P-frame P51. However, the intra-coded macroblocks R1 of the P-frame P52 can be correctly decoded. The controller 104 determines intra-coded macroblocks R2 of a P-frame P53 following the P-frame P52. In addition, the decoding of the P-frame 53 may require some macroblock information derived from decoding the intra-coded macroblocks R1, as shown by an arrow 404. Similarly, the controller 104 determines intra-coded macroblocks R3 and inter-coded macroblocks from a P-frame P54, which is following the P-frame P53. In detail, the macroblock information derived from decoding the intra-coded macroblocks R1 and R2 are acquired and integrated therebetween to decode the inter-coded macroblocks of the P-frame P54. As a result, the macroblock information derived from the intra-coded macroblocks R3 and the inter-coded macroblocks of the P-frame P54 are both available for the decoder 102, thereby establishing spatially corresponded macroblocks of a desired frame, i.e., P-frame P54.

In this embodiment of FIG. 4, the controller 104 establishes the desired P-frame P54 by acquiring macroblock information of the desired P-frame P54 according to the intra-coded macroblocks R1, R2 and R3, respectively from the P-frames P52, P53 and P54. Further, the macroblock information derived from the intra-coded macroblocks R1, R2 and R3 are acquired and integrated to decode other inter-coded macroblocks of the P-frames P53 and P54. The process of establishing spatially corresponding macroblocks of the desired frame is repeated until the macroblock information for all macroblocks of the desired P-frame P54 is acquired. Note that the P-frames P52, P53 and P54 are successive frames and of the same GOP. As a result, the display device 106 displays the desired P-frame P54, rather than the next I-frame I1, thus reducing the latency in changing channels. Note that in an embodiment of the invention, the display device 106 may display a part of the desired P-frame P54, wherein only the part of the macroblocks of the desired P-frame P54 is obtained according to operations described above and design necessity. Thus, repeating the operation until all macroblocks of the desired frames is acquired may not be required.

Note further that the aforementioned embodiments may be applied for any decoding schemes that are based on macroblocks.

Figure 5:
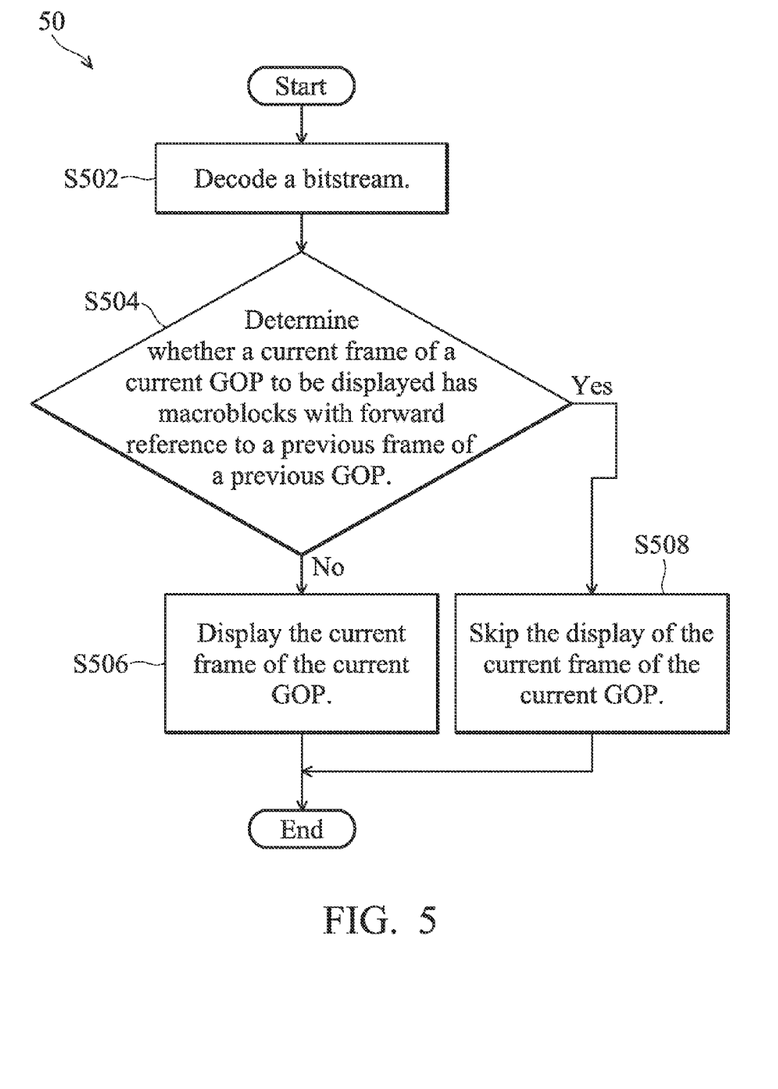
FIG. 5 is a flowchart illustrating an embodiment of a video processing method.

FIG. 5 is a flowchart illustrating an embodiment of a video processing method 50 performed by the video processing apparatus 10 as shown in FIG. 1.

Upon starting the video processing method 50, the decoder 102 receives and decodes a bitstream 108 (step S502). The bitstream 108 comprises a plurality of GOPs and each GOP comprises a frame sequence, as shown in FIGS. 2A and 2B. Next, it is determined whether a current frame of a current GOP to be displayed has macroblocks with forward reference to a previous frame of a previous GOP (step S504). For example, the controller 104 determines whether the B-frame B4 of the GOP1 has macroblocks with forward reference to the absent P-frame P1 of the GOP0, as shown by the arrow 302 of FIG. 3. Note that detailed description of determination is provided in the embodiments in FIG. 3, and is not repeated here.

When the current frame has no macroblock with forward reference to the absent frame of the previous GOP, the display device 106 then displays the current frame of the current GOP (step S506). For example, as shown in FIG. 3, the B-frame B4 of the GOP1 is encoded only with backward reference to the I-frames I1, and the display device 106 displays the B-frame B4 as it can be correctly decoded. Furthermore, when the current frame of the current GOP, e.g., the B-frame B4 of the GOP1, has macroblocks with forward reference to the absent frame of the previous GOP (as shown by the arrow 302), e.g., the absent P-frame P1 of the GOP0, the current frame is skipped or dropped without being displayed on the display device 106 (step S508).

Figure 6:
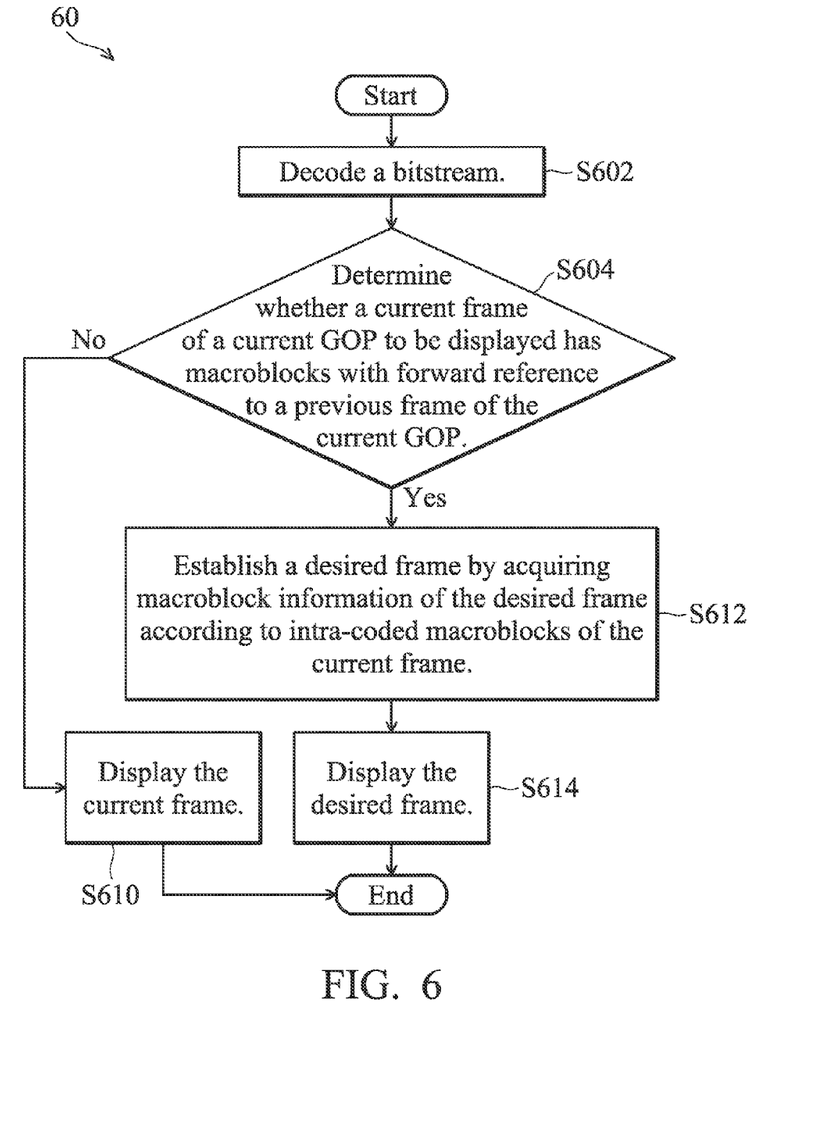
FIG. 6 is a flowchart illustrating another embodiment of a video processing method.

FIG. 6 is a flowchart illustrating another embodiment of a video processing method 60 performed by the video processing apparatus 10 as shown in FIG. 1.

Upon starting the video processing method 60, the decoder 102 receives and decodes the bitstream 108 (step S602). In this illustrated embodiment, the bitstream 108 comprises a plurality of GOPs and each GOP comprises a frame sequence, as shown in FIGS. 2A and 2B.

Subsequently, it is determined whether a current frame of a current GOP to be displayed has macroblocks with forward reference to a previous frame of the current GOP (step S604). As shown in FIG. 4, the controller 104 determines whether the absent P-frame P51 of the GOP0 is referenced by the following P-frame P52 of the GOP0, as shown by arrow 402.

If the current frame of the current GOP has no macroblock with forward reference to the previous frame of the current GOP, the current frame may be composed of intra-coded macroblocks. For example, when the current frame is a P-frame and has no macroblock with forward reference to the previous frame of the current GOP, the P-frame is then intra-coded. As such, since all intra-coded macroblocks of the current frame are available, the display device 106 then displays the current frame (step S610).

Otherwise, if the current fame of the current GOP has macroblocks with forward reference to the previous frame of the current GOP, the current frame is determined to be composed of all or a portion of inter-coded macroblocks. Referring to FIG. 4, the current P-frame P52 has intra-coded macroblocks R1. In addition, the remaining macroblocks of the current P-frame P52 are inter-coded with forward reference to the absent P-frame P51. In this regard, the controller 104 establishes a desired frame by acquiring macroblock information of the desired frame according to intra-coded macroblocks of the current frame. More specifically, the controller 104 establishes the desired frame by acquiring and integrating the macroblock information respectively from a set of successive frames, e.g., P-frames P52, P53 and P54, to obtain entire macroblock information of the desired frame, i.e., the macroblock information for all macroblocks of the desired frame is acquired (step S612). Note that the process of establishing the desired frame was illustrated previously for the embodiments associated with FIGS. 1 and 4, and hence, further description thereof is omitted for brevity. Finally, the desired frame is displayed on the display device 106 (step S614).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A video processing method, comprising:

decoding a bitstream, wherein the bitstream comprises a plurality of groups of pictures and each group of pictures comprises a frame sequence;

determining whether a current frame of a current group of pictures to be displayed has macroblocks with forward reference to a previous frame of a previous group of pictures, wherein the current group of pictures is subsequent to the previous group of pictures; and displaying the current frame of the current group of pictures when the current frame has no macroblock with forward reference to the previous frame of the previous group of pictures;

wherein the previous frame of the previous group of pictures is determined to be referenced by the current frame of the current group of pictures according to information specified from the encoding of the current frame.

2. The video processing method as claimed in claim 1, further comprising:

skipping the display of the current frame of the current group of pictures to be displayed when the current frame has macroblocks with forward reference to the previous frame of the previous group of pictures and the previous frame is absent.

3. The video processing method as claimed in claim 2, wherein the current frame of the current group of pictures to be displayed is a bi-directional predictive-coded frame following the intra coded frame of the current group of pictures and a flag in header of the current group of pictures is used to indicate that the current frame is encoded with forward reference to the previous frame.

4. The video processing method as claimed in claim 1, wherein the bitstream is an MPEG-coded bitstream.

5. A video processing apparatus, comprising:

a decoder for decoding a bitstream, wherein the bitstream comprises a plurality of groups of pictures and each group of pictures comprises a frame sequence;

a controller, coupled to the decoder, for determining whether a current frame of a current group of pictures to be displayed has macroblocks with forward reference to a previous frame of a previous group of pictures, wherein the current group of pictures is subsequent to the previous group of pictures; and a display device, coupled to the controller, for displaying the current frame of the current group of pictures when the current frame has no macroblock with forward reference to the previous frame of the previous group of pictures;

wherein the previous frame of the previous group of pictures is determined to be referenced by the current frame of the current group of pictures according to specified information from the encoding of the current frame.

6. The video processing apparatus as claimed in claim 5, wherein the controller skips the display of the current frame of the current group of pictures to be displayed when the current frame has macroblocks with forward reference to the previous frame of the previous group of pictures and the previous frame is absent.

7. The video processing apparatus as claimed in claim 5, wherein the current frame of the current group of pictures to be displayed is a bi-directional predictive-coded frame following the intra coded frame of the current group of pictures and a flag in the header of the current group of pictures is used to indicate that the current frame is encoded with forward reference to the previous frame of the previous group of pictures.

* * * * *